(12) United States Patent
Boies et al.

(10) Patent No.: US 6,631,309 B2
(45) Date of Patent: Oct. 7, 2003

(54) SYSTEM AND METHOD TO MONITOR DATAMINING POWER USAGE

(75) Inventors: Stephen J. Boies, Mahopac, NY (US); Samuel H. Dinkin, Austin, TX (US); David Perry Greene, Ossining, NY (US); Paul Andrew Moskowitz, Yorktown Heights, NY (US); Philip Shi-lung Yu, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 270 days.

(21) Appl. No.: 09/788,854

(22) Filed: Feb. 20, 2001

(65) Prior Publication Data

US 2002/0120369 A1 Aug. 29, 2002

(51) Int. Cl.⁷ .......................... G05D 11/00; G01R 11/56
(52) U.S. Cl. ........................ 700/291; 700/286; 700/90; 705/412
(58) Field of Search .................. 700/90, 298; 323/1; 702/60, 63; 705/1–11, 412

(56) References Cited

U.S. PATENT DOCUMENTS

| | | | |
|---|---|---|---|
| 4,075,699 A | 2/1978 | Schneider et al. | 364/492 |
| 4,336,462 A | 6/1982 | Hedges et al. | 307/35 |
| 4,899,129 A | 2/1990 | MacFadyen et al. | 340/310 R |
| 4,977,515 A | 12/1990 | Rudden et al. | 364/492 |
| 5,101,191 A | 3/1992 | MacFadyen et al. | 340/310 R |
| 5,572,438 A | 11/1996 | Ehlers et al. | 364/492 |
| 5,699,276 A | * 12/1997 | Roos | 705/412 |
| RE35,793 E | * 5/1998 | Halpern | 700/293 |
| 5,758,331 A | * 5/1998 | Johnson | 705/412 |
| 2002/0103655 A1 | * 8/2002 | Boies et al. | 705/1 |

* cited by examiner

Primary Examiner—Jayprakash N. Gandhi
Assistant Examiner—W. Russell Swindell
(74) Attorney, Agent, or Firm—Duke W. Yee; Stephen C. Kaufman; Stephen J. Walder, Jr.

(57) ABSTRACT

The present invention provides a system and method for a datamining service vendor to provide subscribing power customers with electrical consumption data services. The system and method provide a mechanism by which electrical consumption is measured at the point of consumption over incremental periods of time. Customers can subscribe to a datamining service vendor which monitors and collects customer electrical consumption data at each addressed location within the customer's electrical network and provides the customer with a detailed report of power consumption statistics and trends. This allows the customer to make informed consumption choices resulting in cost savings to the customer and conservation of power generation resources.

30 Claims, 3 Drawing Sheets

SYSTEM AND METHOD TO MONITOR DATAMINING POWER USAGE

BACKGROUND OF THE INVENTION

1. Technical Field

This invention relates to the field of home or business electrical power consumption management. More particularly, the invention relates to a system and method for measurement and reporting of electrical loads in residential and commercial premises by a centralized resource.

2. Description of Related Art

For some years, there has been a great deal of interest in achieving more efficient utilization of electrical power generation capabilities and measuring consumption by users. With a growing awareness of the ecological impact and economic cost of inefficient utilization of resources, electrical power customers have become aware of the desirability of altering their usage patterns. Some power companies already offer rates which vary according to the time of day, to encourage customers to operate appliances such as clothes dryers, pool pumps and dishwashers during off-peak times. Generally, a high rate is charged during certain hours of peak demand and a lesser rate is charged during other hours of off-peak demand. An alternative approach would permit extension of time-of-day rate setting to allow more frequent (e.g., hourly) changes in rates. That would require, though, that the customer be advised of each rate change. To automate this process, it is necessary that the power customer be able to monitor and control power usage by the more significant loads in the customer's residence or business.

The current art reveals the benefits of time-managed appliance usage to the customer only when they receive and study a monthly power bill, which ordinarily provides very little information. The customer does not really know, under real usage conditions, how much it costs to operate one appliance when compared with another. One cannot determine, from a monthly bill, the cost of operating a specific appliance attached to a specific outlet or even the comparative cost of operating two different appliances, or how much will be saved by operating a given appliance at any specific rate. Accordingly, a need exists for a system and method which will provide to a customer informative statistical reports on the amount of power consumed by one or more appliances at specific power outlets and the cost of operating those appliances.

SUMMARY OF THE INVENTION

The present invention provides a system and method for a datamining service vendor to provide power customers with instant, up to the minute, electrical consumption data. The system and method provide a mechanism by which electrical consumption is measured at the point of consumption over incremental periods of time. Customers can subscribe to a datamining service vendor which monitors and collects data regarding the customer's electrical consumption at various points within the customer's electrical system and provides the customer with a detailed report of power consumption statistics and trends. This allows the customer to make informed power consumption choices resulting in cost savings to the customer and conservation of power generation sources.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used below, the term "datamining service vendor" refers to a third party entity which monitors customer power consumption and provides power consumption data to customers which subscribe to and pay for the datamining service. The terms "consumer", "customer" and "subscriber" refer to any person or entity which utilizes the data services provided by the datamining service vendor. "Utility" shall, unless it appears otherwise from the context, be understood to include a utility that distributes electric power and which may or may not be the direct generator of that power. Likewise, many aspects of the invention will have value to other utility and non-utility service providers as well.

Figure 1:
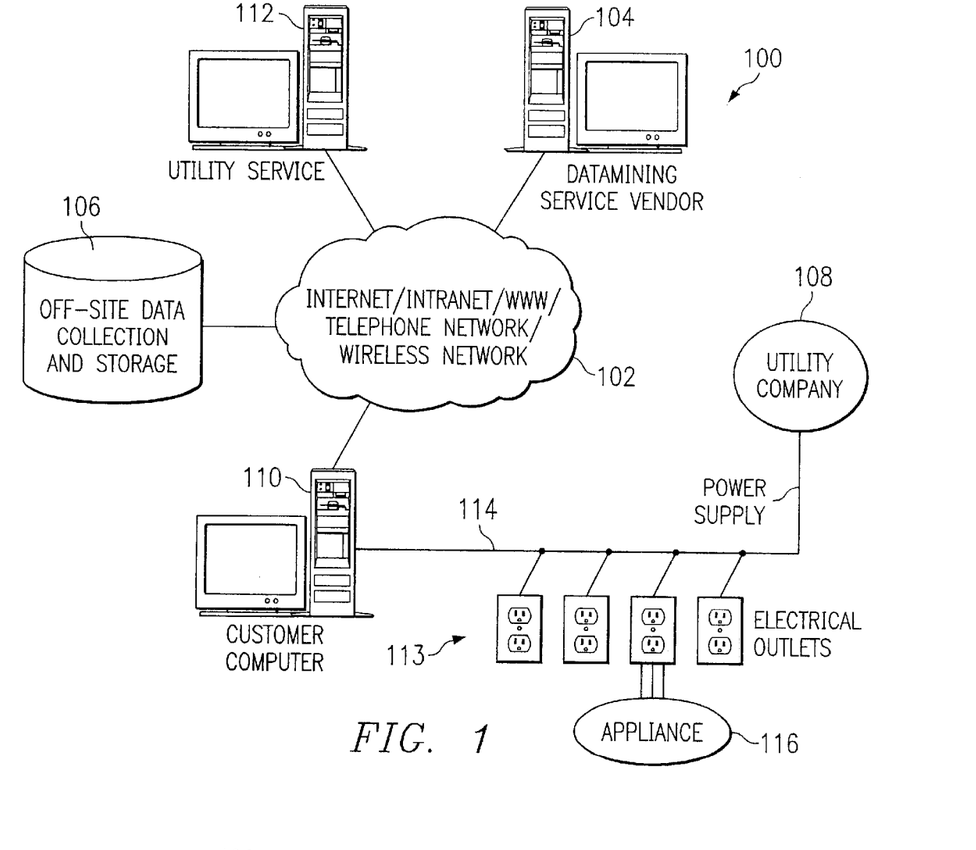
FIG. 1 is an exemplary diagram of a distributed data processing system in which the present invention may be implemented.

With reference to FIG. 1, a datamining service vendor 104 is connected to network 102 along with a data storage unit 106. In addition, customer 110 and utility service 112 also are connected to network 102. Customer 110 and datamining service vendor 104 may be, for example, personal computers or network computers. The datamining service vendor 104 is a third party which monitors the power consumed by a subscribing customer and provides a detailed power consumption and utilization report to subscribing customers for a monthly fee or on a fee per report basis. For purposes of this application, a network computer is any computer, coupled to a network, which receives a program or other application from another computer coupled to the network. In the depicted example, datamining service vendor 104 provides data, such as boot files, operating system images, and applications to customer 110. Distributed data processing system 100 may include additional servers, clients, and other devices not shown. Distributed data processing system 100 may be the Internet with network 102 representing a worldwide collection of networks 102 and gateways that use the TCP/IP suite of protocols to communicate with one another. Of course, distributed data processing system 100 also may be implemented as a number of different types of networks, such as for example, a wireless internet network, an intranet, a local area network (LAN), or a wide area network (WAN). FIG. 1 is intended as an example, and not as an architectural limitation for the present invention.

FIG. 1 also depicts a typical network arrangement for the invention disclosed herein. Utility company 108 supplies power to the customer system which is comprised of electrical network 114 which supplies power to appliances 116 that are connected to power outlets 113. The power consumed at each outlet 113 is measured and the resulting data is collected and stored by onsite computer 110, "smart" outlets 113 or appliances 116, or offsite storage medium 106. The data can be transmitted in real lime, near real time, on a store and forward basis, or as queried by datamining service vendor 104, customer 110 or utility service 112 for analysis via network 102. Datamining service vendor 104 transmits a statistical report of the customer's power consumption via network 102 to the customer 110.

Figure 2:
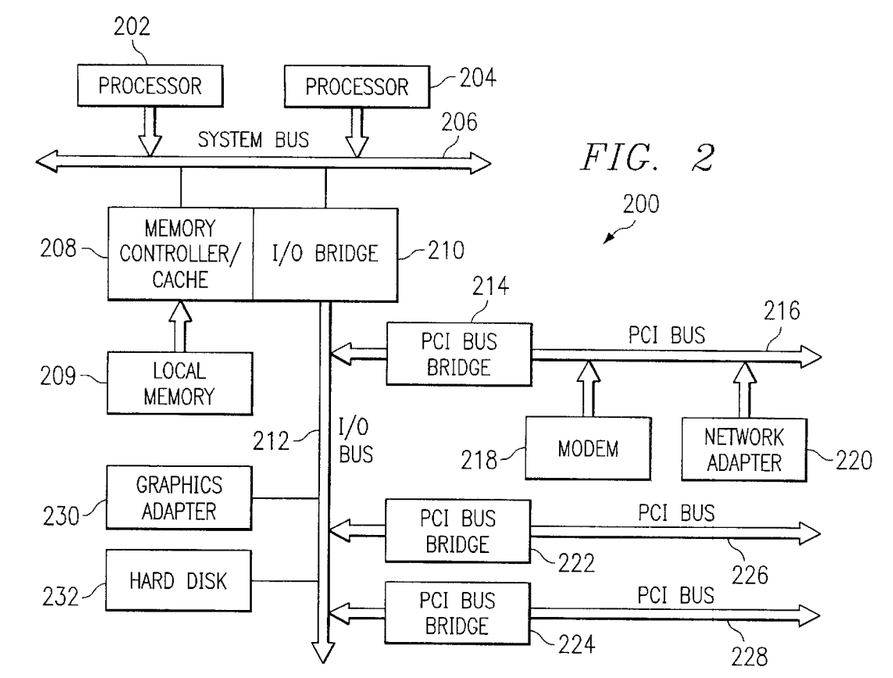
FIG. 2 is a block diagram of a data processing system that may be implemented as a server depicted in accordance with a preferred embodiment of the present invention.

Referring to FIG. 2, a block diagram of a data processing system that may be implemented as a server, such as utility server 112 in FIG. 1, is depicted in accordance with a preferred embodiment of the present invention. Data processing system 200 may be a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted. Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 104–112 in FIG. 1 may be provided through modem 218 and network adapter 220 connected to PCI local bus 216 through add-in boards.

Additional PCI bus bridges 222 and 224 provide interfaces for additional PCI buses 226 and 228, from which additional modems or network adapters may be supported. In this manner, data processing system 200 allows connections to multiple network computers such as customer 110. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
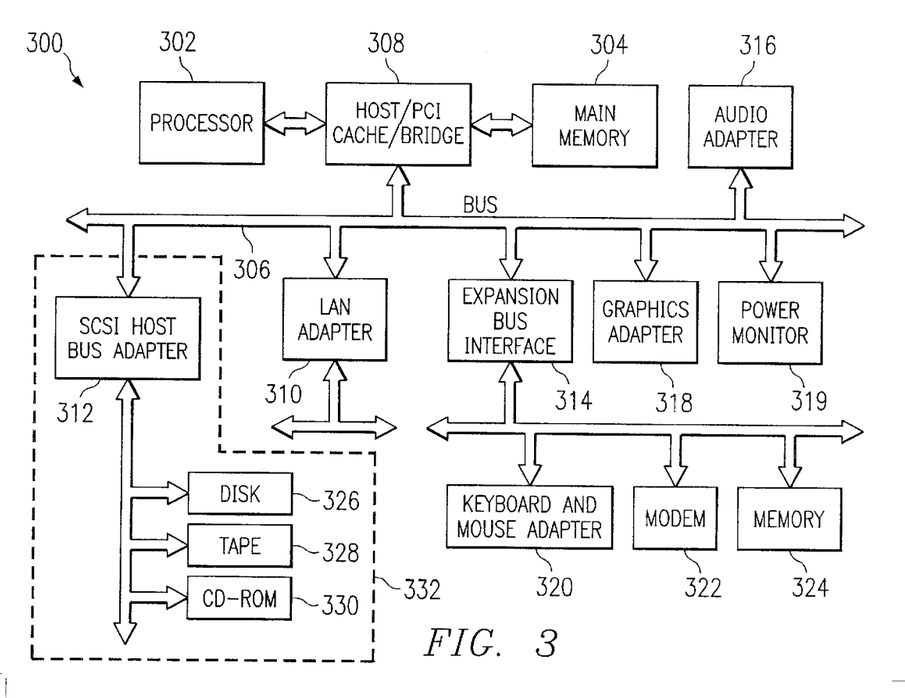
FIG. 3 depicts a block diagram illustrating a data processing system in which the present invention may be implemented.

With reference now to FIG. 3, a block diagram illustrating a data processing system is depicted in which the present invention may be implemented. Data processing system 300 is an example of a computer; such as computer 110 in FIG. 1. Further, data processing system 300 may be modified to include fewer components for use in devices consuming power at a customer location, such as a household appliance 116 or outlet 113. Data processing system 300 employs a peripheral component interconnect (PCI) local bus architecture. Although the depicted example employs a PCI bus, other bus architectures such as Accelerated Graphics Port (AGP) and Industry Standard Architecture (ISA) may be used. Processor 302 and main memory 304 are connected to PCI local bus 306 through PCI bridge 308. PCI bridge 308 also may include an integrated memory controller and cache memory for processor 302. Additional connections to PCI local bus 306 may be made through direct component interconnection or through add-in boards. In the depicted example, local area network (LAN) adapter 310, SCSI host bus adapter 312, and expansion bus interface 314 are connected to PCI local bus 306 by direct component connection. In contrast, audio adapter 316, graphics adapter 318, and power monitor adapter 319 are connected to PCI local bus 306 by add-in boards inserted into expansion slots. In this example, power monitor adapter 319 is connected to an electrical network, such as electrical network 114 in FIG. 1. Expansion bus interface 314 provides a connection for a keyboard and mouse adapter 320, modem 322, and additional memory 324. Small computer system interface (SCSI) host bus adapter 312 provides a connection for hard disk drive 326, tape drive 328, and CD-ROM drive 330. Typical PCI local bus implementations will support three or four PCI expansion slots or add-in connectors.

An operating system runs on processor 302 and is used to coordinate and provide control of various components within data processing system 300 in FIG. 3. The operating system may be a commercially available operating system, such as Windows 2000, which is available from Microsoft Corporation. An object oriented programming system such as Java may run in conjunction with the operating system and provide calls to the operating system from Java programs or applications executing on data processing system 300. "Java" is a trademark of Sun Microsystems, Inc. Instructions for the operating system, the object-oriented operating system, and applications or programs are located on storage devices, such as hard disk drive 326, and may be loaded into main memory 304 for execution by processor 302.

Those of ordinary skill in the art will appreciate that the hardware in FIG. 3 may vary depending on the implementation. Other internal hardware or peripheral devices, such as flash ROM (or equivalent nonvolatile memory) or optical disk drives and the like, may be used in addition to or in place of the hardware depicted in FIG. 3.

Also, the processes of the present invention may be applied to a multiprocessor data processing system.

As another example, data processing system 300 may be a stand-alone system configured to be bootable without relying on some type of network communication interface, whether or not data processing system 300 comprises some type of network communication interface. The depicted example in FIG. 3 and above-described examples are not meant to imply architectural limitations. For example, data processing system 300 also may be a notebook computer or a device in a black box connected to a power supply system at a customer location.

Figure 4:
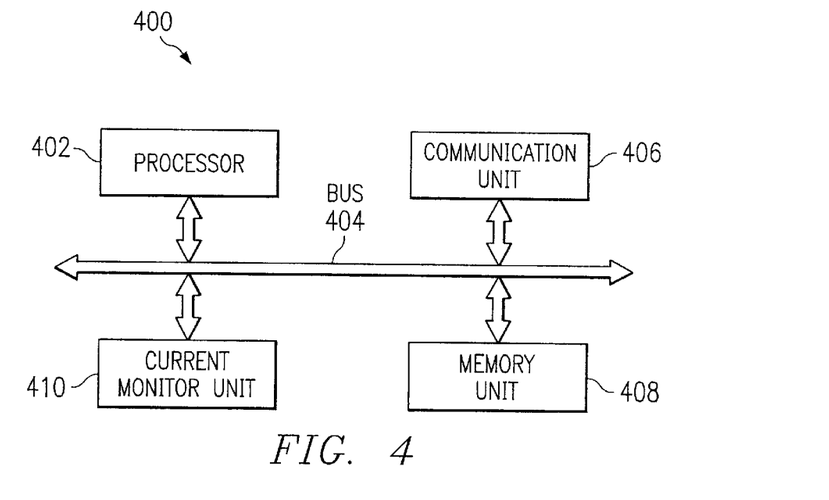
FIG. 4 shows a block diagram illustrating a data processing and control system for a "smart" appliance or outlet in which the present invention may be implemented.

FIG. 4 depicts one embodiment of a control mechanism for a sensor device 400 which can be integrated into "smart" customer outlets 113 or "smart" appliances 116 connected to electncal network 114. Control mechanism for sensor device 400 may include a processor unit 402 connected to system bus 404. A communication unit 406 for sending and receiving data and messages is connected to system bus 404, along with a memory unit 408 for data storage. A current monitor unit 410 is connected to system bus 404 which monitors and collects power consumption data by measuring t amount of current flow at the outlet 113 or appliance 116. In alternative embodiments, sensor device 400 may be retrofitted to existing outlets or appliances as a black box attachment to outlets 13 or appliances 116.

Figure 5:
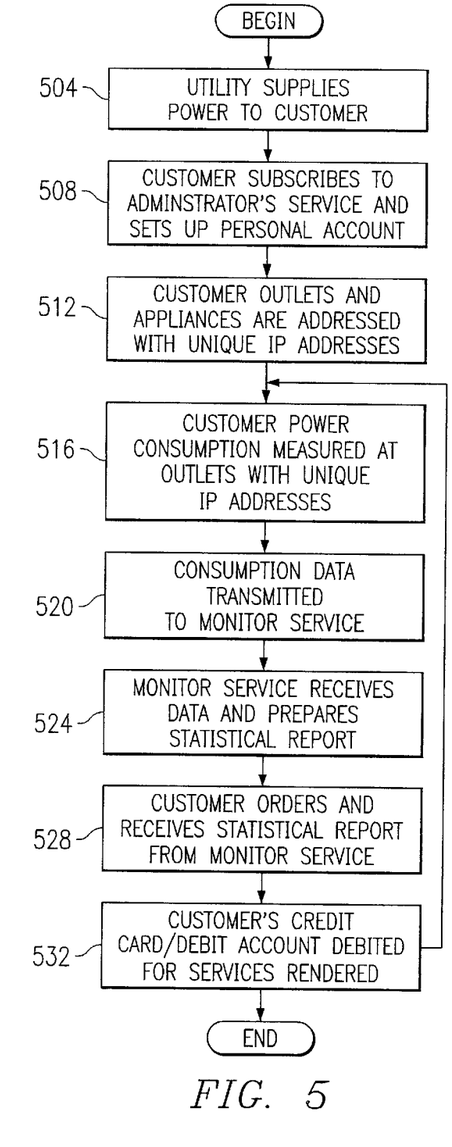
FIG. 5 is a flowchart of a process for datamining utilizing "smart" appliances and outlets depicted in accordance with a preferred embodiment of the present invention; and, FIG. 6 is a flowchart of a process depicting one embodiment of the present invention wherein the datamining service vendor interacts with a customer computer via the internet, a local intranet, or the World Wide Web, to obtain consumption data.

Referring to FIG. 5, a flowchart of a process for monitoring data usage is depicted in accordance with a preferred embodiment of the present invention. The process begins with a customer such as customer 108 in FIG. 1 receiving power supplied by utility via standard power transmission means (Step 504). The customer subscribes to the datamining service vendor via a graphical user interface and establishes a customer account (Step 508). The customer may access the network by means of a wireless device such as a web enabled digital wireless phone or personal digital assistant. The customer account contains pertinent personal identification information, including name, address, and debit or credit card information to which the costs and commissions of the transaction will be posted. Also, the customer may input instructions for the datamining service vendor to alert the customer when data received from the customer electrical network or "smart" outlets or appliances, indicates potential device malfunctions or other problems associated with the operation of the particular outlet, device or electrical network. Alternatively, the datamining service vendor may generate alerts for the customer based on historical or standardized data related to the operation of customer's outlets, devices and electrical network. The customer account is maintained and stored by the datamining service vendor to allow for repeated access and transactions by the customer as is generally known in the art.

Next, the customer's electrical outlets or appliances are assigned unique addresses by either the datamining service vendor, utility service or customer (Step 512). Although any addressing mechanism may be used, the depicted examples assign Internet Protocol (IP) addresses to the outlets. The datamining service vendor monitors the power provided to and consumed at each outlet or appliance via sensor devices attached at each outlet or appliance (Step 516). The power supply and consumption data is then transmitted via the network to the datamining service vendor for statistical analysis (Step 520). The datamining service vendor performs appropriate statistical analysis on the power consumption data and prepares a consumption report (Step 524). The customer orders a report or requests access to real time consumption duty via the network (Step 528). The collected data and analytical report may be recorded, stored and transmitted in XML, HTML or other available computer language format. Next, the customer's account is debited for the provision of the datamining service vendor's services (Step 532). The consumption report is then transmitted to the customer at predetermined intervals of time (e.g. on a monthly basis), transmitted in real time or at the request of the customer. The method is then repeated for the next increment of time or as instructed by the by the customer or datamining service provider.

Figure 6:
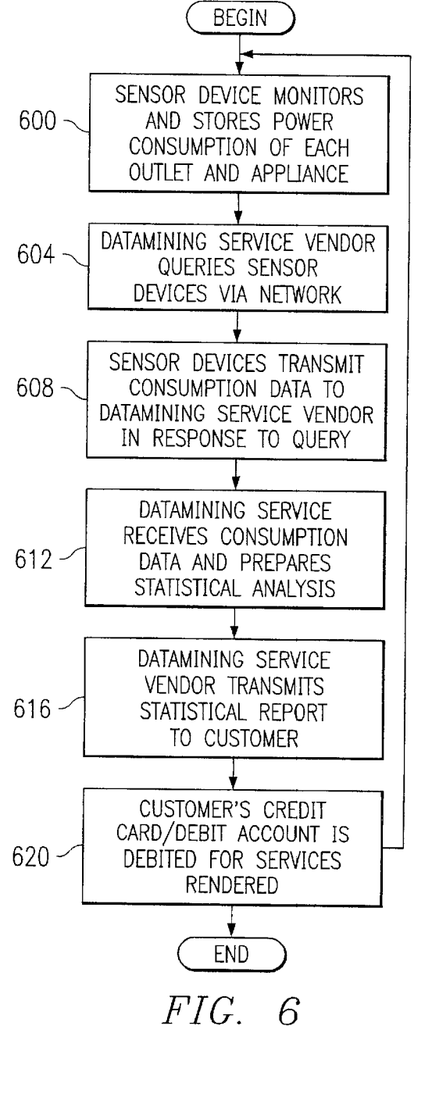

Referring now to FIG. 6, a flowchart of a process for monitoring power consumption at customer outlets and appliances is depicted in accordance with a preferred embodiment of the present invention. The automated power measurement and monitor system according to this invention includes a local area network connected with a home automation data bus such as the CEBus of the Electronic Industries Association, components for implementation of which are marketed by Intellon Corporation of Ocala, Fla. Each appliance or socket electrical load to be monitored by the system is connected to the bus via a sensor device. The sensor device monitors the power supplied and consumed by each outlet or appliance (Step 600). The sensor device may contain a current monitor for monitoring the current flow at each outlet or appliance connected to the electrical network or a power monitor for monitoring the electrical power consumed by each outlet or appliance connected to the electrical network. Next, the datamining service vendor queries the sensor devices at each outlet or appliance for power consumption data (Step 604). The sensor devices may place on the bus or network, in response to a query message, data regarding the power being supplied to each outlet and the loads consumed by each appliance connected thereto. The customer sensor devices transmits the consumption data to the datamining service vendor (Step 608). The datamining service vendor receives the consumption data and prepares a statistical analysis (Step 612). Various datamining analysis can be applied to the consumption data. One example is to provide a usage classification based on the power consumed by a device connected to the customer electrical network during operation of the service. Alternatively, the measurement can be based on incremental units of time. Additional classification reports can be provided based on the noise characteristics of the device. Furthermore, classification can be done based on the digital signature emitted by the device connected to the customer electrical network.

Next, the datamining service vendor transmits the results of the statistical analysis to the customer in report form which presents the customer's power consumption and usage statistics and trends(Step 616). The customer's credit card/debit account is debited for the services rendered by the datamining service vendor (Step 620). The system is then reset or may continue gathering data as instructed by the customer or datamining service vendor.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. Although the depicted illustrations show the mechanism of the present invention embodied on a single server, this mechanism may be distributed through multiple data processing systems. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for datamining the energy consumption of a customer subscriber comprising and;

assigned by a server device an address to a measuring device connected to an electrical outlet at a consumer location, wherein the measuring device measures lower consumption at the electrical outlet;

transmitting a request for power consumption data from the server device directly to the measuring device via at least one network using the address of the measuring device;

receiving, in the server device power consumption data from the measuring device; and analyzing, in the server device, the power consumption data received from measuring device.

2. The method of claim 1 further comprising recording the power consumption data in a storage device associated with the server device.

3. The method of claim 1 further comprising classifying the power consumption data into a class of usage.

4. The method of claim 1 further comprising reporting the power consumption data to the customer.

5. The method of claim 1 wherein the system consumption data is received via one of a local area network the Internet or a Bluetooth connection.

6. The method of claim 1 wherein the power consumption data is received via a broadband cable network.

7. The method of claim 1 an XML record based on the power consumption data.

8. The method of claim 1 further comprising providing an alert of potential device malfunctions to the customer based on the power consumption data received.

9. The method of claim 1 further comprising:

receiving in the server device customer specified alert conditions identifying power consumption conditions that should cause an alert to be sent to the customer;

determining in the server if the power consumption data meets one or more of the alert conditions; and transmitting an alert from the server to the customer if the power consumption data meets one or more of the alert conditions.

10. The method of claim 2 the further comprising recording, in the storage device a time an electrical device coupled to the electrical outlet is activated.

11. The method of claim 10 further comprising recording in the storage device, a time the electrical device is deactivate.

12. The method of claim 11 further comprising recording the storage device, an amount of power supplied during the a time period each the electrical device is operating.

13. The method of claim 3 wherein the class of usage is based on the power consumed by a device connected to the electrical outlet per unit of time.

14. The method of claim 3 wherein the class of usage is based on noise characteristics of a device connected to the electrical outlet.

15. The method of claim 3 wherein the class of usage is based on powerup characteristics of a device connected to the electrical outlet.

16. The method of claim 9 wherein said alert is transmitted to the customer's residence via a telephone connection, the Internet, or a Bluetooth connection.

17. The method of claim 9 wherein said alert is transmitted to the customer vi a wireless network.

18. The method of claim 9 further comprising transmitting the alert to a device repair vendor.

19. A computer program product for datamining the energy consumption of a customer a subscriber comprising:

first instructions for assigning server device, an address to a measuring device connected to an electrical outlet at a consumer location, wherein the measuring device measures power consumption at the electrical outlet;

second instructions for transmitting a request for power consumption data from the server device directly to the measuring device using the address of the measuring device;

third instructions for receiving in the server device consumption data from the measuring device; and forth instructions for analyzing in the server device, the power consumption data received from the measuring device.

20. The computer program product of claim 9, further comprising fifth instructions for recording the power consumption data in a storage device associated with the server device.

21. The computer program product of claim 19 further comprising fifth instructions or classifying the power consumed by a device connected to the electrical outlet into a class of usage.

22. The computer program product of claim 19 further comprising fifth instructions for reporting the power consumption data to the customer.

23. The computer program product of claim 20 wherein said fifth instructions further comprises recording the power consumed by a device coupled to the electrical outlet.

24. The computer program product of claim 20 wherein said fifth instructions further comprises recording the power supplied to the electrical outlet.

25. The computer program product of claim 21 wherein said fifth instructions further comprises classifying the power consumed by the device per unit of time.

26. The computer program product of claim 21 wherein said film instructions further comprises classifying the power consumed by a by the device based on a noise characteristic of the device.

27. The computer program product of claim 21 wherein said fifth instructions further comprises classifying the power consumed by the device based on startup characteristics of the device.

28. The computer program product of claim 21 wherein said fifth instructions further comprises classifying the power consumed by a the device based on the a digital signature emitted by the device.

29. The computer program product of claim 19 further comprising sixth instructions for generating an alert based on the power consumption data.

30. The computer program product of claim 29 wherein said sixth instructions further comprises transmitting the alert as to a device repair vendor.

* * * * *

UNITED STATES PATENT AND TRADEMARK OFFICE
CERTIFICATE OF CORRECTION

PATENT NO. : 6,631,309 B2
DATED : October 7, 2003
INVENTOR(S) : Boise et al.

It is certified that error appears in the above-identified patent and that said Letters Patent is hereby corrected as shown below:

Title page,
Delete "30 Claims, 3 Drawing Sheets" and insert -- 31 Claims, 3 Drawing Sheets --.

Column 6,
Line 67, after "comprising", delete "and;" and insert -- : --.

Column 7,
Line 1, delete "assigned" and insert -- assigning, --; and after "device" insert -- , --.
Line 3, delete "lower" and insert -- power --.
Line 9, after "device", insert -- , --.
Line 12, before "measuring", insert -- the --.
Line 20, delete "system" and insert -- power --.
Line 21, after "network" and insert -- , --.
Line 25, after "claim 1 ", insert -- further comprising creating --.
Line 31, after "receiving", insert -- , --; and after "device", insert -- , --.
Line 34, after "determining", insert -- , --; and after "server", insert -- , --.
Line 39, after "claim 2", delete "the".
Line 40, after "device", insert -- , --.
Line 42, after "recording", insert -- , --.
Line 43, delete "deactivate", insert -- deactivated --.
Line 45, after "recording", insert -- , in --.
Line 46, after "during", delete "the".
Line 47, after "period", delete "each".
After line 56, insert -- 16. The method of claim 3 wherein the class of usage is based on a digital signature emitted by a device connected to the electrical outlet --.
Line 57, delete "16." and insert -- 17. --.

Column 8,
Line 1, delete "17." and insert -- 17. --.
Line 2, after "customer", delete "vi" and insert -- via --.
Line 3, delete "18." and insert -- 19. --.
Line 5, delete "19." and insert -- 20. --.
Line 6, after "customer", delete "a".
Line 7, after "assigning", insert -- , by a --.
Line 15, after "receiving", insert -- , --; and after "device", insert -- power --.
Line 17, delete "forth" and insert -- fourth --; and after "analyzing", insert -- , --.

UNITED STATES PATENT AND TRADEMARK OFFICE
CERTIFICATE OF CORRECTION

PATENT NO.     : 6,631,309 B2
DATED          : October 7, 2003
INVENTOR(S)    : Boise et al.

It is certified that error appears in the above-identified patent and that said Letters Patent is hereby corrected as shown below:

Column 8 (cont'd),
Line 20, delete "20." and insert -- 21. --; and delete "claim 9" and insert -- claim 20 --.
Line 24, delete "21." and insert -- 22. --; and delete "claim 19" and insert -- claim 20 --.
Line 25, after "instructions", delete "or" and insert -- for --.
Line 28, delete "22." and insert -- 23. --; and delete "claim 19" and insert -- claim 20 --.
Line 31, delete "23." and insert -- 24. --; and delete "claim 20" and insert -- claim 21 --.
Line 34, delete "24." and insert -- 25. --; and delete "claim 20" and insert -- claim 21 --.
Line 37, delete "25." and insert -- 26. --; and delete "claim 21" and insert -- claim 22 --.
Line 40, delete "26." and insert -- 27. --; and delete "claim 21" and insert -- claim 22 --.
Line 41, after "said", delete "film" and insert -- fifth --.
Line 42, after "consumed", delete "by a".
Line 44, delete "27." and insert -- 28. --; and delete "claim 21" and insert -- claim 22 --.
Line 48, delete "28." and insert -- 29. --; and delete "claim 21" and insert -- claim 22 --.
Line 50, after "by", delete "a"; and after "on", delete "the".
Line 52, delete "29." and insert -- 30. --; and delete "claim 19" and insert -- claim 20 --.
Line 55, delete "30." and insert -- 31. --; and delete "claim 29" and insert -- claim 30 --.
Line 57, after "alert", delete "as".

Signed and Sealed this

Eleventh Day of May, 2004

JON W. DUDAS
*Acting Director of the United States Patent and Trademark Office*

Disclaimer 6,631,309 — Stephen J. Boies, Mahopac, NY (US); Samuel H. Dinkin, Austin, TX; David Perry Greene, Ossining, NY (US); Paul Andrew Moskowitz, Yorktown Heights, NY (US); Philip Shi-lung Yu, Chappaqua, NY (US). SYSTEM AND METHOD TO MONITOR DATAMINING POWER USAGE. Patent dated Oct. 7, 2003. Disclaimer filled Oct. 4, 2006, by the assignee, International Business Machines Corporation.

Hereby enters this disclaimer to all claims of said patent.

*(Official Gazette February 27, 2007)*